United States Patent
Nagasaka et al.

(10) Patent No.: US 6,195,497 B1
(45) Date of Patent: *Feb. 27, 2001

(54) ASSOCIATED IMAGE RETRIEVING APPARATUS AND METHOD

(75) Inventors: Akio Nagasaka, Kokubunji; Takafumi Miyatake, Hachioji; Hirotada Ueda, Kokubunji; Kazuaki Tanaka, Yokohama, all of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/327,869

(22) Filed: Oct. 24, 1994

(30) Foreign Application Priority Data

Oct. 25, 1993 (JP) .................................................. 5-266071

(51) Int. Cl.$^7$ ...................................................... H04N 5/94
(52) U.S. Cl. .............................. 386/46; 386/69; 345/327; 345/335; 345/418
(58) Field of Search .................................. 358/335, 311, 358/341, 342, 343; 360/13, 14.1, 14.2, 14.3, 33.1, 69; 395/614–615, 683, 806–807, 173, 949, 174; 345/122, 327, 335, 418; 386/52, 53, 55, 1, 46, 69

(56) References Cited

U.S. PATENT DOCUMENTS

| | | | |
|---|---|---|---|
| 5,157,511 | * 10/1992 | Kawai et al. | 358/335 |
| 5,264,933 | * 11/1993 | Rosser et al. | 358/183 |
| 5,339,393 | * 8/1994 | Duffy et al. | 395/161 |
| 5,388,197 | * 2/1995 | Rayner | 395/154 |
| 5,404,316 | * 4/1995 | Klinger et al. | 364/514 |
| 5,532,833 | * 7/1996 | Hong et al. | 358/335 |
| 5,777,618 | * 7/1998 | Kita et al. | 345/418 |

FOREIGN PATENT DOCUMENTS

| | | | |
|---|---|---|---|
| 0 390 041 A2 | * 3/1990 | (EP) | H04B/1/20 |
| 3-52070 | 3/1991 | (JP) | . |
| 3-282779 | 12/1991 | (JP) | . |
| 4-347772 | 12/1992 | (JP) | . |
| 5-20366 | 1/1993 | (JP) | . |
| 5-108730 | 4/1993 | (JP) | . |
| 5-204990 | 8/1993 | (JP) | . |
| 6-223179 | 8/1994 | (JP) | . |

OTHER PUBLICATIONS

MacNeil, Generating multimedia presentations automatically using TYRO, IEEE, pp. 74–79, Aug. 1991.*
O'Docherty et al., Multi–media Info. The Management. & Semantic Retr. of all Elect. Data Types, The Computer Journal, pp. 225–238, Mar. 1991.*
Davenport et al., Cinematic Primitives for Multimedia, pp. 67–74, Jul. 1991.*
Crane, Hypermedia and the study of Ancient Culture, pp. 45–51, Jul. 1991.*

* cited by examiner

*Primary Examiner*—Wendy Garber
*Assistant Examiner*—Vincent F. Boccio
(74) *Attorney, Agent, or Firm*—Antonelli, Terry, Stout & Kraus, LLP

(57) ABSTRACT

This invention relates to an associated video retrieving method and a method therefor which enable a user to freely and easily make associated video retrieval. Video display apparatus having a video display region for visualizing video, an index display region for displaying index information of the videos, point detection unit for detecting a point position for these display regions, object management unit for registering in advance matters or sound in an animation appearing in the video, and control unit for determining a condition of the video to be next playbacked from point information obtained by the point detection unit and from logical structure description of the video separately built up, are provided. Even when a desired scene cannot be specified from the index information, a scene in which any hints relating to the desired scene is found out and associated video retrieval is effected on the basis of such a scene so as to finally obtain the desired scene. Versatile video retrieval can be made by unitedly using each display.

12 Claims, 13 Drawing Sheets

PHYSICAL VIDEO STRUCTURE

ASSOCIATED IMAGE RETRIEVING APPARATUS AND METHOD

BACKGROUND OF THE INVENTION

This invention relates to an apparatus and a method for associatively retrieving videos and searching an arbitrary video.

Construction of data bases directed to video information such as motion pictures and videos, which have not been handled in the past, has been vigorously made in recent years with a higher operation speed and a greater capacity of computers. With such a technical background, practical utilization of retrieving technology of efficiently selecting a desired scene from among large quantities of videos so built up is now under way. An ordinary retrieving method for such a purpose in the field of the video data base is the one by which a user designates a characterizing feature of a desired scene or its keyword and a computer searches the scene having a coincident keyword. However, it is extremely difficult, not only for inexperienced users but also skilled users in retrieval, to precisely designate the characterizing feature of a given scene, and a desired retrieving result cannot be obtained in most cases.

Books as classical information have a table of contents and an index as auxiliary information for retrieval. The table of contents is information in which keywords symbolizing portions of texts are listed in the sequence of progress in the texts. The index is information which lists important keywords in the texts in the order which is easy to find out, such as in the order of alphabet. The greatest feature common to them is that such keywords are collectively illustrated as a list. They always exist at the beginning and the end of the book, and require no trouble for searching them. A reader can find out one paragraph in the text by looking up the table of contents and the index without considering the keyword himself. The reader can also grasp the outline of the text by referring to the table of contents and can judge within a short time whether or not the book is worth reading.

Retrieval using the table of contents and the index involves the problem that a suitable portion cannot be found out if the number of keywords listed is too large, and, on the other hand, the keywords do not exist from the beginning if the number of keywords is too small. This problem can be solved by conjointly using hypertext or full text retrieval. In other words, the number of items of the table of contents and the index is first limited to a certain extent and is represented to the reader. The reader refers to the text by using temporarily the second best keyword which might be related with an object portion and then searches a keyword having a direct relation with the desired portion in the text. If such a keyword is found out, the object can be accomplished by referring to the desired portion by using the mechanism of the hypertext. This is the technique which is typically used in retrieval of an on-line manual. Though the keywords must be registered in advance in the hypertext, the same procedure can be executed for unregistered keywords when full text retrieval is adopted. In this way, the range of utilization of the table of contents and the index can be expanded depending on the mechanism for associatively tracing the keyword and in many cases, the reader can search the desired portion by merely selecting the keywords which appear in front of his eyes (hereinafter referred to as "associated retrieval").

Such a mechanism is believed to be effective for video retrieval also. In the videos, various matters appearing in the video such as persons, materials, etc, can be used in a manner corresponding to the keywords described above. An essential technique for accomplishing associated retrieval using the matter described above, such as a system of looking up associated scenes and information from the matters appearing on a display screen of videos, is described in JP-A-3-52070 entitled "Associated Information Reference System of Animations". According to this system, means for storing a video period in which each matter in a video appear and the position there of and means for combining associated information corresponding to the former are provided, a jump to an associated scene can be easily made and associated information can be easily called out by pointing one point on the screen in which each matter is displayed. Means for saving the trouble of establishing correspondence between each matter and its associated information by using video processing is described in JP-A-5-204990 filed by the inventors of the present invention.

The prior art technologies described above provide primarily means for establishing correspondence between each matter and its associated information but do not sufficiently examine the construction of an entire retrieving system and simple use of the system by the user. They also involve the problem that only that matter for which correspondence to the associated information has been already established can be associatively traced.

SUMMARY OF THE INVENTION

It is an object of the present invention to provide an interface which enables a user to associatively trace his or her memory and to find a desired scene by merely selecting limited information submitted by a computer during video retrieval.

It is the second object of the present invention to provide means capable of associatively tracing matter for which correspondence has not been made in advance.

The present invention includes a video display region for displaying an arbitrary video on a screen, an operation panel region for controlling a playback condition of the video, a display region for displaying index information corresponding to the table of contents and the index of the video, means for detecting which of these display regions is pointed and means for determining the condition of the video to be played next from this point information and description information of videos built up separately. Further, means for grasping a matter in the display and its position and displaying, in superposition, the associated information of the matter, and associated information registration changing means are provided. There is further provided means for registering and managing information necessary for these processings described above.

Further, there are disposed means for designating a specific matter appearing in a scene during the display, means for extracting a characterizing quantity of the matter, means for searching another video scene having a characterizing quantity coincident with the characterizing quantity described above, and means for immediately jumping to the video scene thus searched.

According to the present invention, an object scene can be reached by sequentially tracing any matters having association with a desired scene even though information of the matter having a direct relation with the desired scene does not exist in index information of the video when the desired scene is searched. Since index display and associated retrieval are thus combined organically, the range of utilization of the index can be drastically expanded and, in most cases, the desired scene can be retrieved by merely selecting the information submitted by a computer. Accordingly, the user need not consider suitable keywords or video features which primarily define the desired scene, and can retrieve the scene even when his or her memory is uncertain. Accordingly, the present invention is comprehensible even to amateurs. The associated information superposition means displays a part of or all of the information selected from among the associated information of the matter appearing in the video under playback, in superposition with the position of the matter in the displayed video or in the form which clearly represents that this matter and its associated information correspond to each other. Accordingly, the user can immediately learn information about the matter appearing in an associated retrieval and can accurately learn the information of particular matter without any confusion. Because the associated information registration changing means is provided, a part of or all of the associated information of the matter appearing in the video during playback can be immediately registered or changed the instant that the matter appears.

Even when the information for jumping to an associated scene is not yet imparted to the matter displayed on the screen at present, means for extracting the characterizing feature of the matter from the display screen and collating the characterizing feature can retrieve another scene in which the matter appears, and can futher display the scene.

DESCRIPTION OF THE PREFERRED EMBODIMENTS

Hereinafter, an embodiment of the present invention will be explained in detail.

Figure 2:
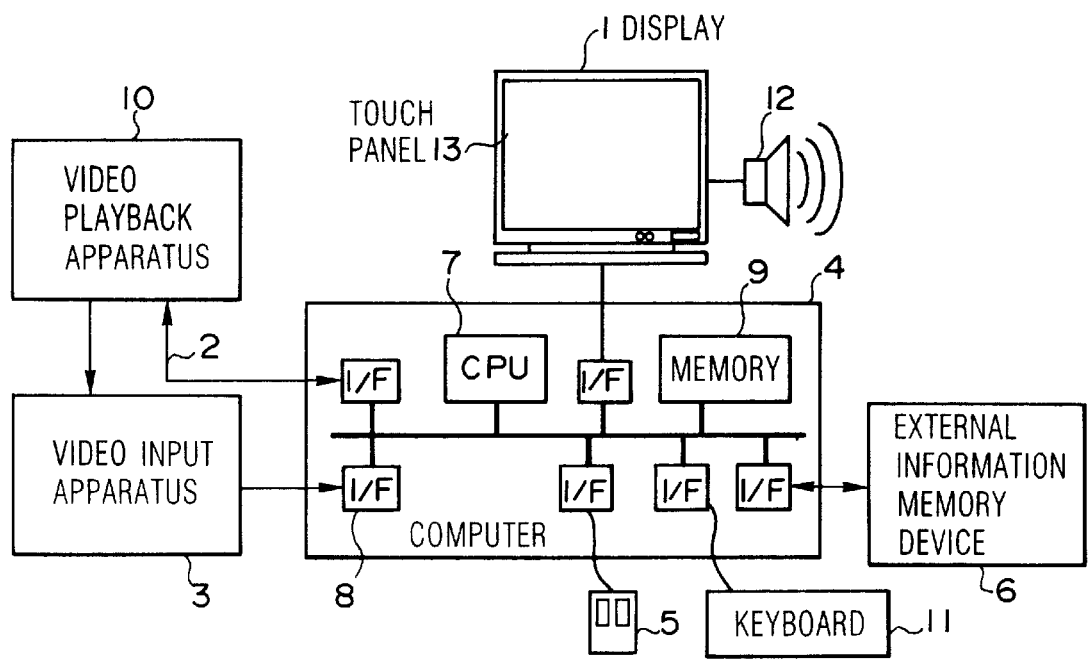
FIG. 2 is a block diagram showing an apparatus construction of an associated video retrieving system according to an embodiment of the present invention.

FIG. 2 is a schematic block diagram showing an example of a system construction for accomplishing the present invention. Reference numeral 1 denotes a display such as a CRT, which displays an output screen of a computer 4. Reference numeral 12 denotes a speaker for sound playback. Commands to the computer 4 can be given by using a direct pointing device 13 such as a touch panel or a keyboard 11. Video signals output from a video playback apparatus 10 are sequentially converted to a format system which the computer 4 can handle, through a video input apparatus 3, and are sent to the computer 4. The video data inside the computer enters a memory 9 through an interface 8 and is processed by a CPU 7 in accordance with a program stored in the memory 9. Numbers such as frame number are sequentially allotted to each frame of the videos handled by the video playback apparatus 10 from the start of the video. When the frame number is sent from the computer 4 to the video playback apparatus 10 through a control line 2, the video of a scene corresponding to the frame number is played back. The video data and various information can be stored in an external information memory device 6. The memory 9 stores various kinds of data generated by the processings which will be explained below, besides the programs, and these data are looked up, whenever necessary.

Hereinafter, the outline of an associated video retrieving system will be explained and then, a detailed execution procedure of each technology will be explained.

Figure 1:
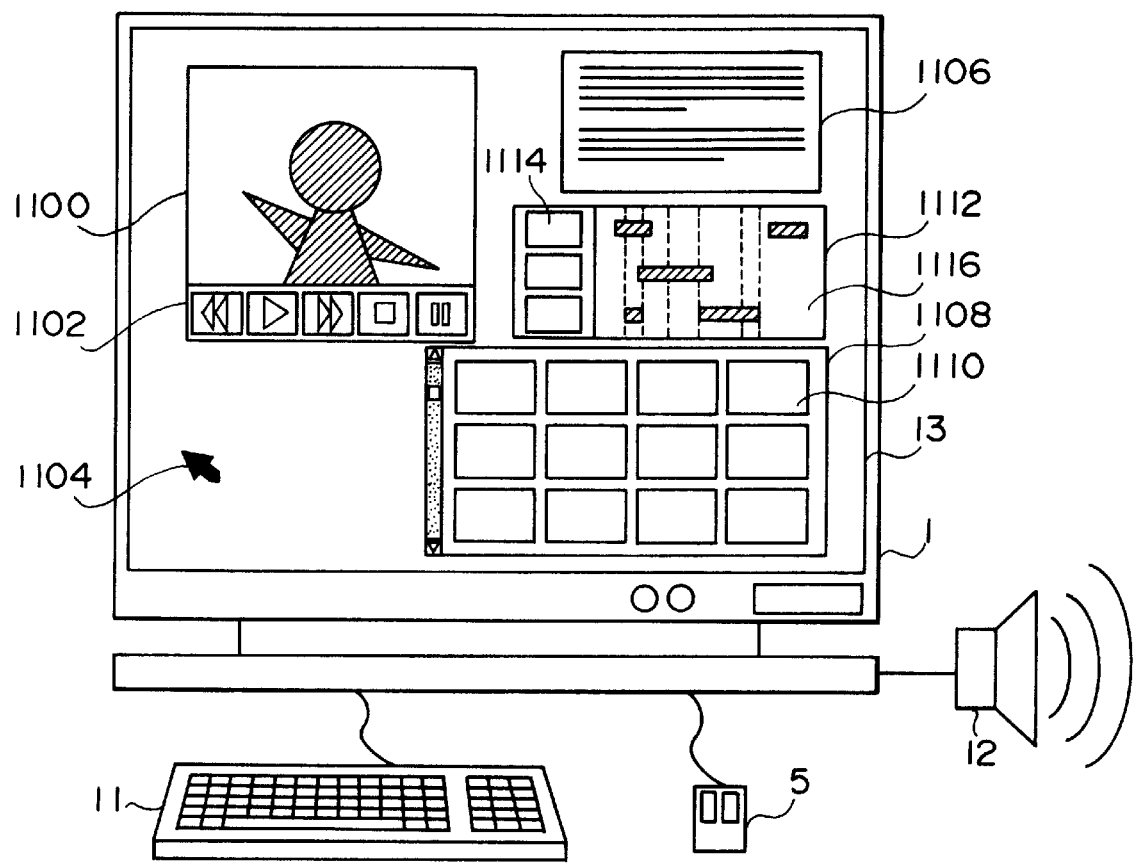
FIG. 1 shows a structural example of a screen of a system for accomplishing associated video retrieval.

FIG. 1 shows an example of a screen of a system for accomplishing associated video retrieval. Reference numeral 1 denotes a display, 12 is a speaker for outputting voice and BGM, 5 is a direct pointing device such as a mouse or a joystick, 11 is a keyboard, and 13 is an indirect pointing device such as a touch panel.

A monitor window 1100 inside the display 1 serves as a monitor screen and includes an operation panel 1102 of the same system as a VCR. It can freely playback the video so that they can be viewed. The video displayed on the monitor screen corresponds to the "text" of a "book", and a panel (button) operation does to the "page turn" operation. A window 1108 at lower right corresponds to a collective display of each scene of object images appearing in the scene and a window 1112 to the intermediate right corresponds to the collective display of the objects appearing in the video. These collective displays will be generically referred to as the "index". The scene collective display of the window 1108 is generated by selecting typical frame images from each scene in the video, diminishing them, and aligning them sequentially time-wise in the form of a table as icons. These images can be regarded as "captions" of the scene, and a scene table obtained by aligning them in a time sequence corresponds to a "table of contents" of a "book". On the other hand, the subject is one of the important constituent elements of the scene and in this scene, corresponds to a "keyword" in the text. Accordingly, the collective display of the subjects in the window 1112 corresponds of an "index to a book". When a given icon 1110 is clicked by the mouse in the scene collective display, the video on the monitor screen is switched and the scene represented by the icon is played back. The collective display of the subjects comprises an icon 114 representing the subject and a time axis display portion (line graph) 1116 on the right side of the icon 1114. The time axis display portion (line graph) has a time axis in which the left end represents the start of the video and the right end represents the end of the video. The portion represented by a line indicates the time period in which the subject appears. When the line portion is clicked, the videos in this time period are displayed on the monitor screen. Incidentally, reference numeral 1104 denotes a cursor which moves in correspondence with the movement of the pointing device such as the mouse, and reference numeral 1106 denotes a general purpose input/output window for displaying variously associated data of the videos.

Next, the basic concept of associated video retrieval according to the present invention will be explained with regards to a simple example. It will be assumed that a certain user wants to find a specific scene in which a subject B appears from among a series of videos. If the icons of the object scene (the scene in which the subject B appears) and the icon of the subject B itself fortunately exist in the scene collective display of the typical images displayed in the index, the desired objective can be accomplished by clicking and playing them back. Generally, however, the video information is enormous and it is difficult in many cases to easily find desired scene. (For example, if the time in which the subject B appears is short, retrieval cannot be made so easily, as can be readily appreciated.) Therefore, associated video retrieval has great significance in the present invention. In other words, there are the cases where the user has some knowledge regarding the desired scene (subject B) even though he cannot directly search the desired scene (subject B), and in such case, the present invention establishes a link in the name of "association" by utilizing such knowledge. For example, if the user remembers that the subject B and the subject A appear simultaneously (or such a scene exists) or if he believes that there is a high possibility that they appear simultaneously, then, an attempt to first search the subject A is made.

Figure 3:
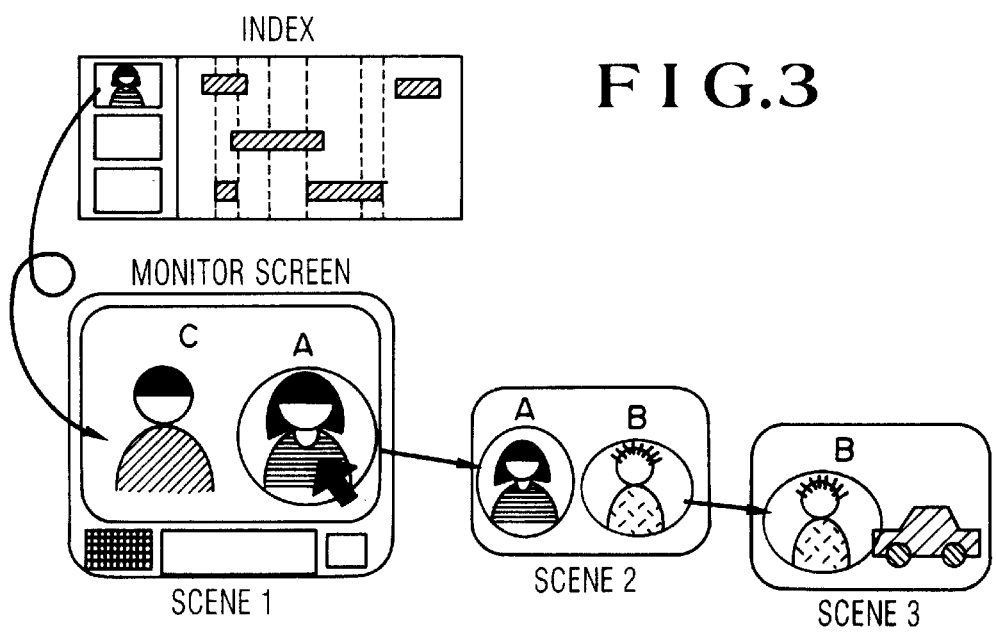
FIG. 3 is an explanatory view of an associated video retrieving function.

FIG. 3 shows the example of the associated video retrieving function according to the present invention. Three pictures in the drawing (scenes 1 to 3) represent one scene in the picture displayed on the monitor screen when associated video retrieval is made. For example, the user searches one scene illustrating the subject A which enables him to associate the desired subject B among the index (icon 1114 of the subject of the window 1112) and displays it on the monitor screen. When the scene 1 on the extreme left is played back on the monitor screen of the monitor window 1100, the subject A among the subjects A and C represented at that time is clicked by the mouse. Then, the scene switches to the scene 2 at the center of the drawing in which the subject A appears. When the other subject B also appearing in this scene 2 is clicked, the scene 3 on the right side in which B appears can be reached. If this scene is the desired scene, associated video retrieval is terminated.

In other words, when the specific scene in which the subject B appears is to be found, the specific scene of the subject B as the target scene is associatively traced back through the subject A registered to the index, on the basis of the association that the subject B appears simultaneously with the subject A. At this time, a complicated operation of contemplating the keyword is not necessary, and it is only necessary to execute selection by watching only the information appearing on the screen.

Incidentally, retrieval can be made on the basis of not only the association between a plurality of subjects but also the association between the scenes, words, BGM, superimposed dialogues and all other multi-media information, as will be explained later.

The information necessary for accomplishing the associated video retrieving function are basically as follows:

(1) the video period when the subjects appears (appearing period);

(2) the position of the subject on the screen (appearing position); and (3) other video periods to be switched when a click is made (link information).

These three kinds of information are handled as a set.

Which of the subjects is clicked during video playback is determined from (1) the appearing period and (2) the appearing position, and the switch destination of the video is decided by (3) the link information. Here, the video is made up of 30 still pictures per second which are referred to as a "frame" and are continuously displayed. When a serial number referred to as the "frame number" is allotted to these frames from the start of the videos, the appearing period (1) can be expressed by the leading frame number and the trailing frame number of that period. The appearing position (2) is the coordinates information representing in which region of each frame of the period (1) the subject is represented. As the link information (3), link is applied so that different scenes in which the same subject appears can be sequentially traced. In many cases, the same subject appears several times and in such cases, all the scenes in which the subject appears can be easily called out by this link by merely clicking the mouse.

The associated video retrieving method having the construction described above can be applied only to the subject for which the link information has already been set. However, among the three kinds of necessary information described above, the appearing period of the subject and its appearing position can be determined by the retrieving technology described in JP-A-4-261033 filed by the inventors of the present invention.

Figure 4:
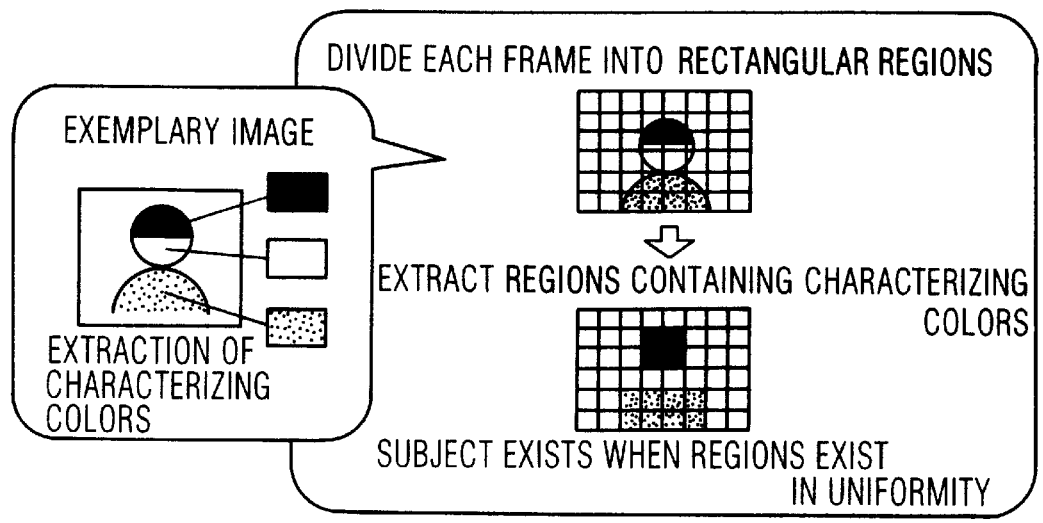
FIG. 4 is an explanatory view of a subject retrieving method.

The outline of the subject automatic retrieving algorithm is shown in FIG. 4. The basic operation is to find out the combination of colors inherent to the subject to be searched from the frames. First, the user selects a frame in which the subject appears from the video image as a typical image, and extracts a characterizing color or colors from the video. Next, the system divides one by one all of the frames in the video into small blocks, and searches the blocks containing the characterizing colors. When a predetermined number of blocks containing the characterizing colors exists for each color in one frame, the frame is judged as containing the subject. The appearing position of the subject in this frame can be easily determined by examining at which position the blocks containing the characterizing colors of the subject are distributed in the frame.

However, this subject retrieving method itself is based on the principle that the exemplary video is submitted to the system, at least one period when the subject appears must be found by a manual operation, and this operation is troublesome in many cases. In the case of associated video retrieval according to the present invention, however, the subject on the monitor screen can be directly used as the exemplary video and for this reason, the subject retrieving method can be utilized extremely effectively.

Further, if all of the frames in the video are divided in advance into blocks and the list of the kinds of colors contained in each block is stored in a memory device, the block division processing for each frame from the subject retrieval becomes unnecessary, and the processing speed can be made extremely fast. This speed is 100 times the real time speed even by performance of existing work stations, and the appearing periods of of the subjects can be searched within about 30 seconds from one-hour long video. If only one appearing period which is the nearest to the video presently displayed needs be found, it can be searched within a few seconds. Naturally, the same list of the colors stored in the memory device can be used irrespective of the subjects to be searched.

Hereinafter, the execution procedure of the system for accomplishing the present invention will be explained with reference to a block diagram of a software module executed by the CPU 7 in accordance with the program stored in the memory 9. Here, each module can be accomplished by the hardware itself.

Figure 5:
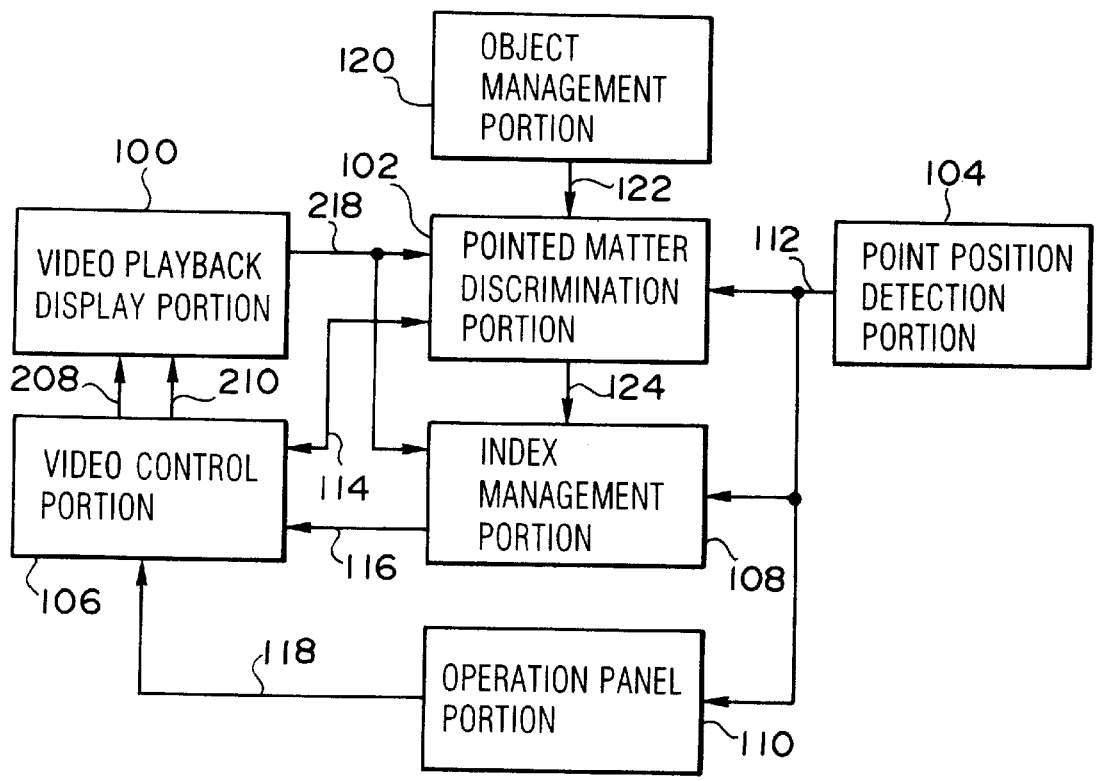
FIG. 5 is a processing block diagram for accomplishing associated video retrieval.

FIG. 5 is an example of the processing block diagram for accomplishing associated video retrieval of the scene according to the present invention. It will be assumed that the information representing at which time and at which position in the video the matters such as the subject in the video as the key of associated video retrieval appears (the appearing period and the appearing position), the information associated with the former and the information on the scenes as the jump destination (link information) are built up in advance in the memory 9 shown in the drawing or in the external memory device 6 in the form of the data structure referred to "object" which will be described later.

Figure 6:
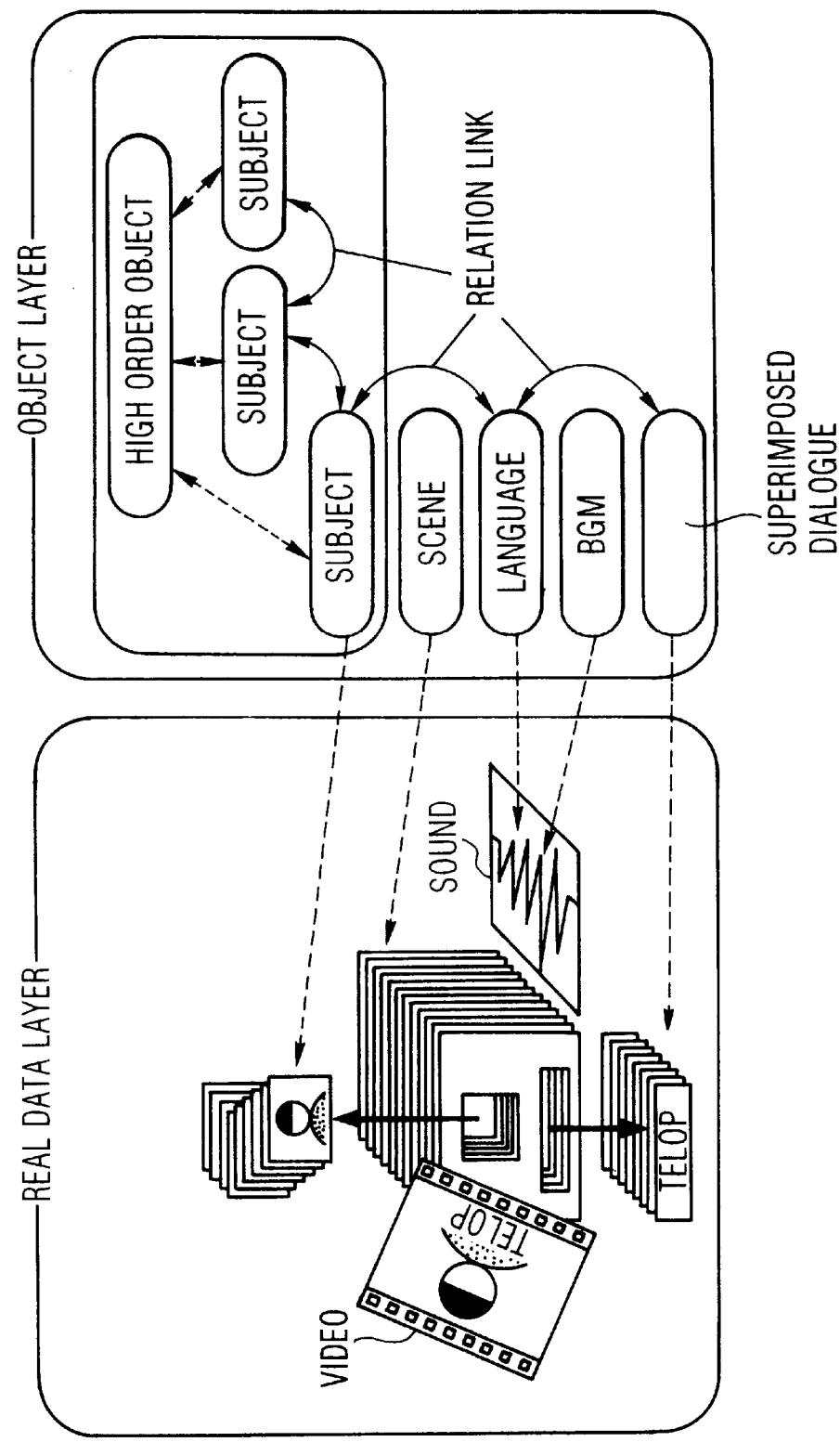
FIG. 6 is a schematic view of an objected-oriented data structure.

Here, the information on the matters in the video such as the subject is managed in an object-oriented data structure which is generated one by one for each appearing period. FIG. 6 is an explanatory view showing such a concept. Hereinafter, this will be referred to as the "video object" or merely as the "object". The video is divided into a motion picture portion and a sound portion. The motion picture can be expressed as a whole by a three-dimensional space comprising an x-y plane forming the frame image and the axis of the time t, and the appearing period and the appearing position of the subject can be regarded as its partial space. The video object is defined as the data structure which is caused to correspond to this partial space on a 1:1 basis. (In other words, even in the case of the same subject, the data structure is defined as the video object for each appearing period, in principle, and link is established between these video objects (between the subjects). Various information such as the superimposed dialogue, scenes, etc, in the video besides the subject can be defined for the video object. As to sound information such as speech, BGM, etc, too, the video object can be similarly defined as the data structure which is caused to correspond on a 1:1 basis to an arbitrary partial period of the sound information space having the time axis. As described above, management can be made in the framework of the common data structures even when the corresponding media are different such as the motion picture, sound, etc, and the link can be freely set between all the information in the video.

Turning back now to FIG. 5, the processing block diagram will be explained in detail. An object management portion 120 is a module which manages these objects, executes registration, change and deletion of the objects, loads information 122 of the object which satisfies the condition offered by another module if such a request is made, and submits it to the other module. A video playback/display portion 100 executes playback and display processings of the video for the monitor window 1100 as the monitor screen of the display 1 shown in FIG. 1, and sends playback position information 218 of the video displayed at present to a point matter discrimination portion 102. A point position detection portion 104 always monitors the indirect pointing device such as the mouse or the direct pointing device 13 such as the touch panel shown in FIG. 1 and sends the position information 112 on the display screen when the user affects the operation of the point. It also sends the position information 112 to the index management portion 108 and an operation panel portion 110. The pointed matter discrimination portion 102 sends the playback position information 218 it receives from the video playback/display portion 100 to the object management portion 120, and acquires the information on all of the matters registered as appearing at the playback position, as the objects. If the corresponding object exists, the pointed matter discrimination portion acquires the position information of the matters from the object, collates it with the position information 112 from the point position detection portion 104 and discriminates which matter is pointed to. The pointed matter discrimination portion 102 sends the information 114 on the matter so discriminated to the video control portion 106. In order to execute a processing for jumping to other scenes in which the matter appears, the video control portion 106 sends the control information 208 to the video playback/display portion 100 on the basis of the link information among the information 114 on the discriminated matters. It also sends the control information 210 to the video playback/display portion 100 when the associated information of the matters is displayed, as will be described later. The index management portion 108 stores the typical frame images of the registered images as the icons 1110, and collectively displays these icons on the window 1108. The index management portion 108 stores the frame numbers with these icons 1110 and when it detects that the point position detection portion 104 points to a certain icon, the index management portion 108 transmits the control information 116 to the video control portion 106 so that the scene corresponding to this icon is played back. The video control portion 106 receives the information 124 regarding which matter is pointed, from the pointed matter discrimination portion 102, and executes display so that the fact that the matter is pointed can be known from the index, too. The index management portion 108 also manages the collective display of the subjects of the window 1112 shown in FIG. 1. In other words, it displays the icon 1114 representing which is the subject, makes the time axis display (line graph display) of that subject, and sends the control information 116 to the video control portion so that the video of the period can be played back when the line portion of the line graph is clicked. The operation panel portion 110 display the operation panel 1102 of FIG. 1 representing various playback states such as normal playback, fast-forward, rewinding, etc, and when the point position detection portion 104 detects that the operation panel is pointed, the operation panel portion 110 sends the control information to the video control portion 106 so that the operation mode is switched to the playback state corresponding to the operation panel so pointed.

Figure 7:
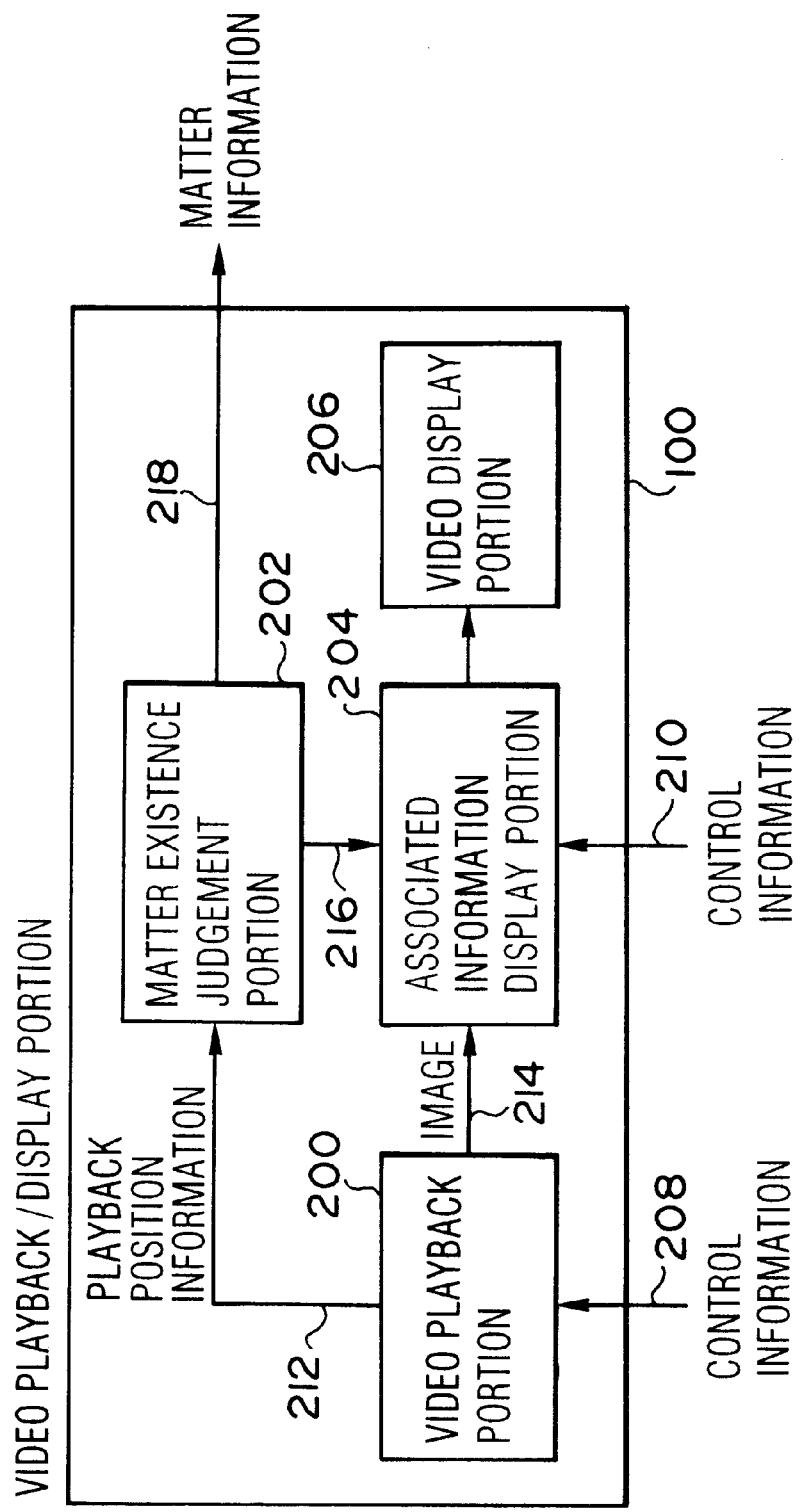
FIG. 7 is a detailed processing block diagram of a video playback/display portion.

FIG. 7 shows an example of the processing block diagram showing in further detail the video playback/display portion 100. A video playback portion 200 receives the control information 208 sent from the video control portion 106, which information instructs which video should be playback from which position and in which way, and playbacks the video. Playback position information 212 of the video displayed at present is sequentially sent to a matter existence judgement portion 202. This judgement portion 202 checks whether or not the matters registered in advance exist in the video at the playback position, and, if they exist, acquires the position information 216 on all the matters appearing on the display screen, and sends the information to an associated information display portion 204. The position information 216 is the same as the position information acquired by the pointed matter discrimination portion 102 described already, and can be sent as the matter information 218 to the point matter discrimination portion 102 in order to avoid overlap of position data acquisition processing. The associated information display portion 204 can simultaneously display the associated information of each matter during playback on the screen. The control information 210 decides whether or not the associated information should be displayed and if it should, which associated information should be displayed in which form. Particularly, the position information 216 of the matters makes it possible to clarify to which position during display the information corresponds. This display method will be described later. Overlap synthesis processing is made for the video 214 depending on the display method, and the video is displayed by the video display portion 206.

Figure 8:
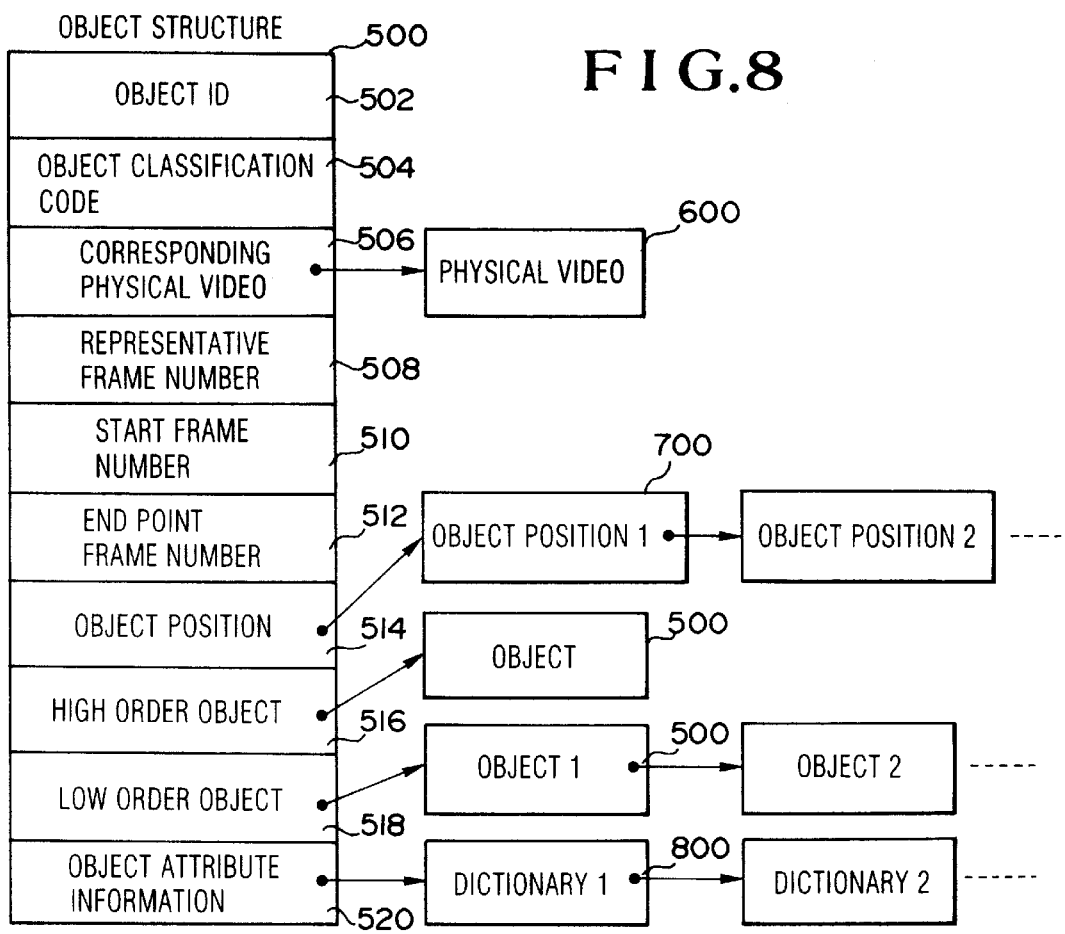
FIG. 8 is a diagram showing a structure for storing a video object.

FIG. 8 shows an example of the data structure of the video object. Reference numeral 500 denotes a basic framework of the data structure. Reference numeral 502 denotes an ID number of an object and a primary number is given to an object so as to discriminate it from other objects. Reference numeral 504 denotes a classification code representing whether the object represents people, superimposed dialogue or speech, for example. Reference numeral 506 denotes a point in the video in which the object appears. As will be later described, the video in this example has a hierarchical data structure divided into physical video 600 and logical video 900. Reference numeral 506 denotes a pointer to the physical video. Reference numeral 510 denotes a frame number of the start of the period when the matter in the video represented by the object appears, and reference numeral 512 denotes the frame number of the end point. Reference numeral 508 denotes the frame number of the frame image representing the matter. Under the interface visually handling the object, the frame number is used as patterns of icons. Reference numeral 514 denotes a pointer to a structure 700 for representing the position of the matter represented by the object on the screen.

Figure 9:
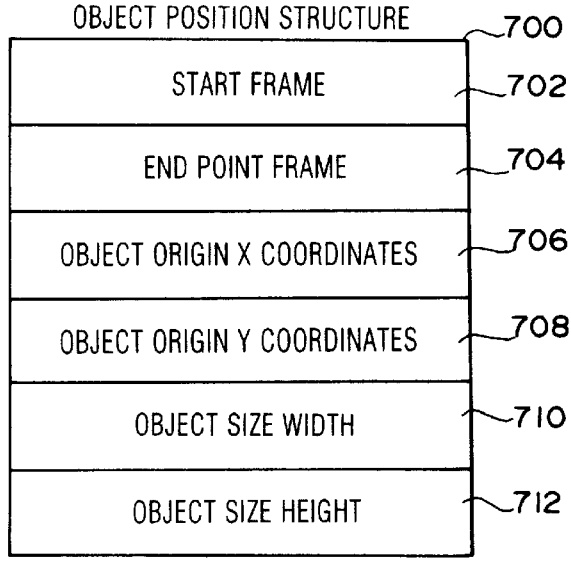
FIG. 9 is a diagram showing a structure for storing a position of an object.

FIG. 9 shows an example of an object position structure 700. This structure is formed one by one for each period when movement of the matter does not exist or is small, and assumes the form of a connection list in which such periods are sequentially connected. Reference numeral 702 denotes a start frame number of the period in which no movement exists, and 704 denotes an end point frame number. Reference numerals 706 to 712 denote the origin coordinates and sizes of a rectangular region when the matter is encompassed by the rectangular region. Reference numeral 516 denotes a pointer to the object having a higher order of abstractness. All of the objects can have intrinsic associated information, but there is the case where the associated information would be better shared by several objects. For example, in the case of subjects such as people and other matters in the video, the same subjects are mostly appear in a plurality of scenes. Needless to say, the appearing posture and behaviour are different from scene to scene. Although the intrinsic associated information exists for each scene, the information having high abstractness such as name, sex, age, occupation, etc, would better be shared because the data quantity can be made small, and conformity is not destroyed even when the information is updated. In this sense, the data structure provides such information having high abstractness to the associated information of the objects of a high order and has a pointer to such objects at 516. Reference numeral 518 denotes a pointer for looking up the objects of a low order from the objects of a high order. This is because both the object of a high order and the object of a low order use the same data structure 500. Needless to say, since the information directly associated with the video such as the start/end point frames, the position information, etc, are not necessary for the objects of a high order, a simple structure omitting them can be used, too.

Figure 10:
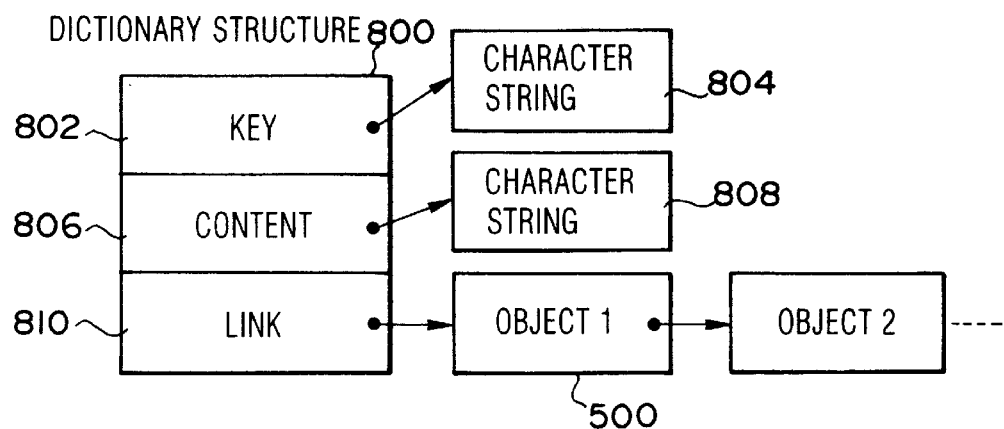
FIG. 10 is a diagram showing a structure for storing a dictionary.

Reference numeral 520 denotes a pointer to a dictionary 800 for storing the associated information of the matters. As shown in FIG. 10, the dictionary comprises a key 802 as a pointer to a character string 804 serving as a key for calling the associated information, a content 806 as a pointer to a character string 808 of the associated information to be registered in the correspondence relation with the key character string and a link 810 having a pointer to associated objects. The dictionary is generated in the same number as the number of items of the associated information to be registered, and these dictionaries are sequentially connected to form a connection list. The associated information of the object is read out by designating the key and returning the content of the dictionary structure which coincides with the key. When the key is the "name" and the content is "Taro", for example, the associated information, that is, "Taro", can be obtained when the key "name" is designated. Selection as to which associated information should be displayed in the associated information display portion 204 results in the processing at to the content corresponding to which key should be displayed. The link is the pointer to the matter of the jump destination when associated retrieval is made. A character string or a symbol representing the meaning of the link such as "the same subject appearing in other scenes" enters the content 806 and the pointer to the object of that subject enters the link destination 810, for example. When jump is made in associated retrieval, the video control portion 106 reads out the video in which the subject appears and the leading frame number from this object structure, and controls the video playback portion 200 so as to execute playback from this video position.

Figure 11:
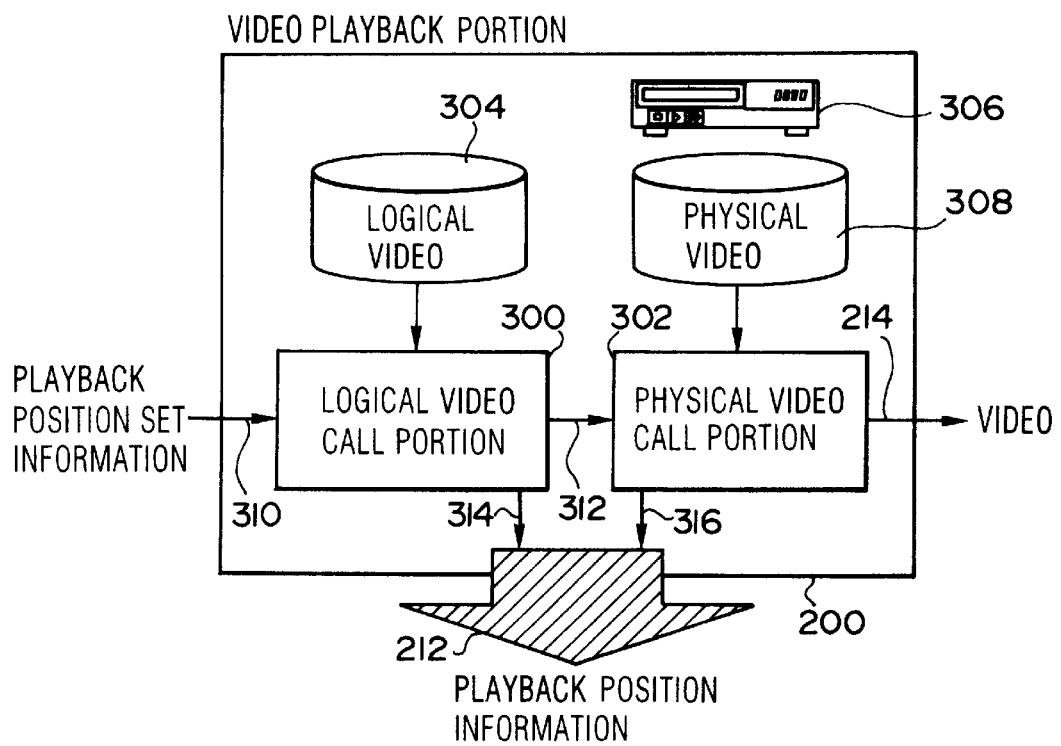
FIG. 11 is a detailed processing block diagram of a video playback portion.

FIG. 11 is a more detailed processing block diagram of the video playback portion 200. The video has the two-storied hierarchical structure comprising the logical video and the physical video. The logical video has only the structure information as the aggregate of the scenes while the physical video has the real data of the video. A logical video call portion 300 calls out the logical video coinciding with the library 304 of the logical video from the playback position set information 310 sent from the video control portion.

Figure 12:
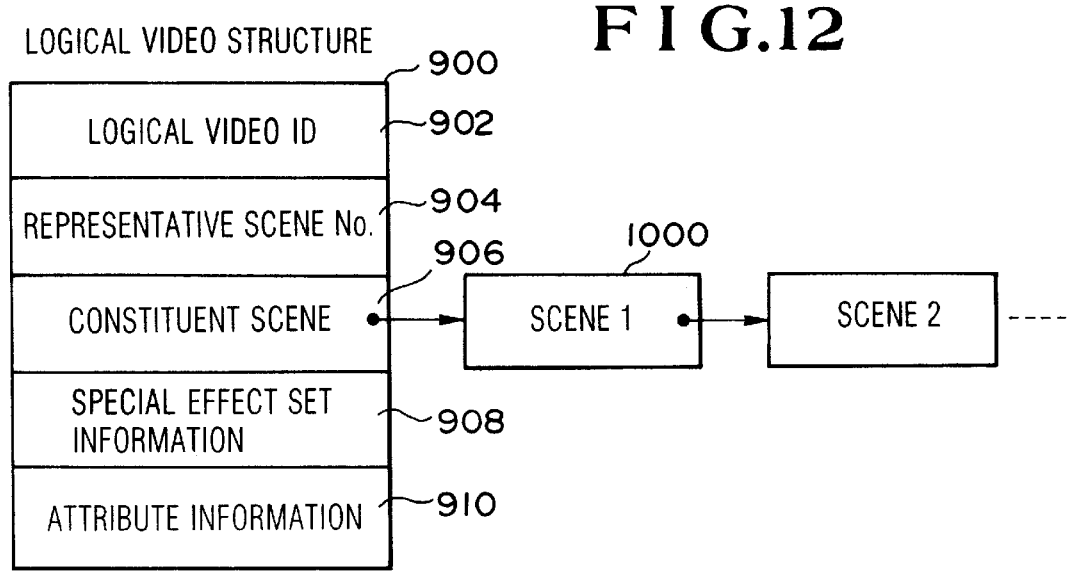
FIG. 12 is a diagram showing a structure for storing a logical video.

FIG. 12 shows an example of the data structure 900 of the logical video. Reference numeral 902 denotes an ID number for primarily specifying the logical video. Reference numeral 904 denotes the number of a scene representing the logical video. Reference numeral 906 denotes a connection list which represents the constituent scenes, and the scenes 1000 are connected in the sequence of playback. Reference numeral 908 denotes set information of special effects such as dissolve and wipe between the scenes, and various associated information enters 910.

Figure 13:
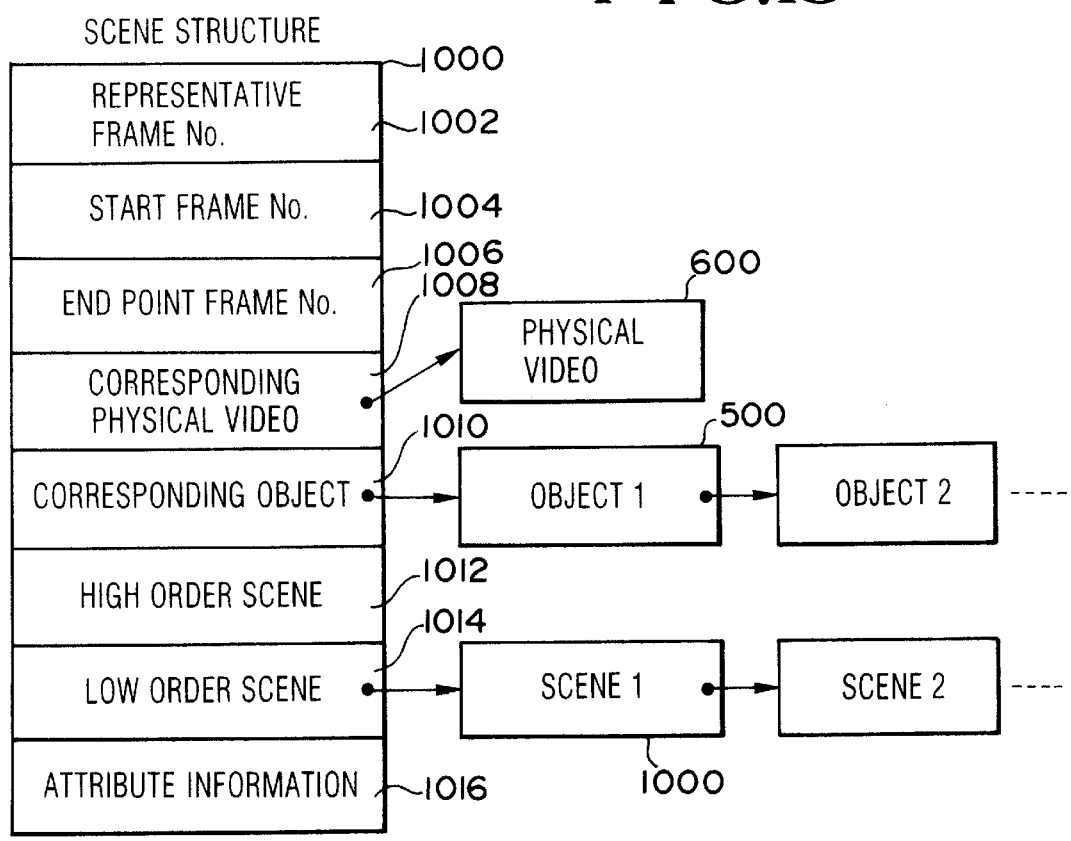
FIG. 13 is a diagram showing a structure for storing a scene.

FIG. 13 shows an example of a scene structure 1000. Reference numeral 1002 denotes a representative frame number of the scenes, 1004 is the start frame number and 1006 is the end point frame number. A pointer to a corresponding physical video enters 1008. A data structure of all the matters appearing in this scene, that is, a pointer to the objects, enters 1010 in the form of the connection list. The scene can gather the connection of the video contents in a unit and can make hierarchical management in a pyramid form. A high order scene 1012 is a pointer to such a high order scene, and a low order scene 1014 is a pointer to a connection list formed by connecting all the scenes of the stage immediately therebelow. Reference numeral 1016 denotes an attribute information of the scene. The physical video call portion 302 decides the physical video to be called out from the library 308 of the physical videos and the frame position to be playbacked, by the information 312 formed by adding the scene information to the frame number at 300.

Figure 14:
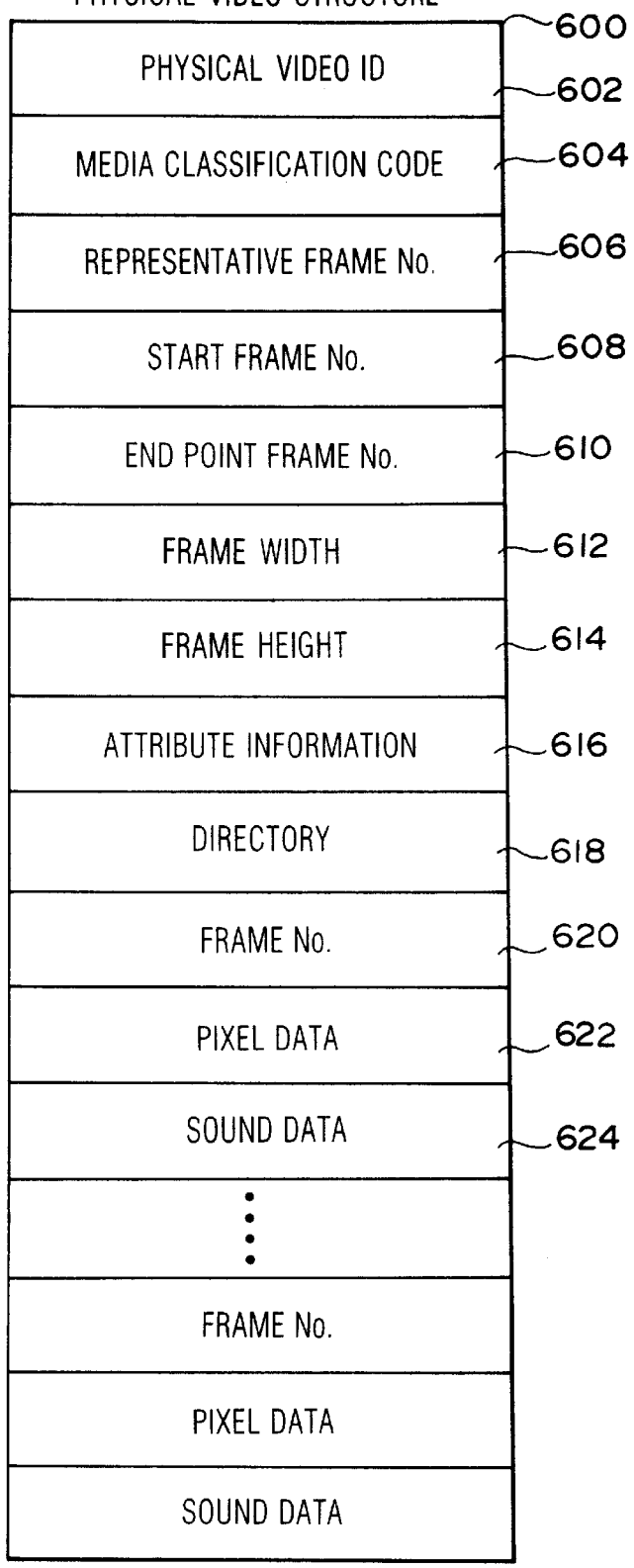
FIG. 14 is a diagram showing a structure for storing a physical video.

FIG. 14 shows an example of the physical video structure 600. Reference numeral 602 denotes an ID number for specifying primarily the physical video. Reference numeral 604 denotes a classification code for discriminating whether the video is recorded in a laser disk or a video tape or is data stored in the external information device. Reference numeral 606 denotes a representative frame number, 608 is a start frame number and 610 is an end point frame number. Attribute information enters 616. Remaining data are information which become necessary when the video data has them in the data structure of the physical video. Reference numeral 612 denotes a video width of the video, 614 is a video height and 618 is a directory for storing at which address of the physical video the frame video data corresponding to a certain frame number exists. Reference numeral 620 denotes a frame number, 622 is pixel data of the frame and 624 is sound data. Such a system of arrangement repeats in the number of times corresponding to the number of frames. When the video is recognized as the video using the video playback apparatus 10 such as the laser disk from the classification code, the physical video call portion sends the control instruction to the video playback apparatus, executes the processing for calling out the corresponding video, and calls out the video when it exists in the physical video.

One of the merits brought forth by using the logical video resides in that diversified video products edited in various ways can be formed in a smaller data quantity by one physical video the data quantity of which is likely to become enormous. The merit of the use of the logical video becomes particularly great in the videos in which past documentary video such as the news are frequently used. Another merit is that the procedure of examining which matters appear during playback need not be made for all the objects by storing in advance the objects appearing in each scene, and quick processing can be expected.

The execution procedure of the interface portion of associated retrieval will be explained in detail by using the computer screen example shown in FIG. 1 and briefly explained already. An arbitrary video is displayed on the monitor window 1100 by the afore-mentioned video playback/display portion 100. The sound, too, is output from the speaker 12 with display. Reference numeral 1104 denotes a cursor, which moves on the screen with the operation of the indirect pointing device 5 such as the mouse or the joystick, and executes the point operation. A similar point operation can be carried out by the direct pointing device 13 such as the touch panel, and in such a case, the cursor can be eliminated. The point position detection portion 104 described already always monitors such a pointing device. When the cursor 1104 is moved in alignment with the movement of the mouse or when the button of the mouse is pushed, the point position detection portion 104 sends the position information of the cursor on the screen at this time to each processing module requiring the position information. In the case of the touch panel, the point position detection portion 104 detects the touched position when a touch is made, and sends the position information. Reference numeral 1102 denotes an operation panel for controlling the playback condition of the video, and displays buttons depicting figures and characters for representing the playback condition such as playback, fast-forward, etc, buttons for changing the operation modes and a display region for displaying various information from the video playback/display portion, by the operation panel portion 110. When the point position detection portion 104 transmits the information that the display region of the operation panel is pointed, the operation panel 1102 detects which button is pointed by the position information and sends the control code corresponding to that button to the video playback/display portion 100. Reference numeral 1106 denotes a general purpose input/output window, which can exchange various information with the computer by using the keyboard 11, etc. The video for associated retrieval can be designated from this window by inputting the file name. The input file name is sent as playback position set information 310 to the video playback portion 200 with the number of the leading frame representing the playback start position. The logical video call portion 300 in the video playback portion 200 calls out the corresponding video from the information, and the video is displayed on the monitor window 1100 through the physical video call portion. Various associated information of the video can also be displayed on this general purpose input/output window 1106.

When the point position detection portion detects that one of the icons 1110 under display on the window 1108 is pointed to, the index management portion 108 transmits the leading frame number of the scene corresponding to the icon as the playback set information to the video playback/display portion 100. This display portion 100 displays the video of that scene on the monitor window 1100. Control such as playback, fast-forward, etc, can be made for the video so displayed, by the operation panel 1102. Accordingly, when playback of the video is started, the playback position information 314 output by the logical video call portion 300 is transmitted to the index management portion 108, which effects highlighting such as highlighting or turning on and off the icon in the scene under playback on the window 1108 so that the scene corresponding to the video presently play back on the monitor window 1100 can be known at a glance.

Display of the scenes on the window 1108 can be hierarchically made. First, two kinds of pointing modes, e.g. click and double click, are prepared. A click of the mouse is used as point means for calling out the video while a double click is used as point means for hierarchical management of the scenes which will be described later. When the point position detection portion detects that one of the icons displayed on the window 1108 is pointed to, the index management portion 108 examines whether or not this point is double click. If it is not double click, the video call processing described above is carried out and if it is double click, the low order scene 1014 in the scene structure 1000 corresponding to the pointed scene is looked up, a window similar to the window 1108 is generated afresh, and the icons of such low order scenes are collectively displayed. The window generated afresh in this way becomes the object for detecting point in the same way as the window 1108. When the icon on this window is pointed to, the index management portion displays the corresponding scene on the monitor window and if any low order scenes exist, it generates afresh a window for collectively displaying such low order scenes. Such a hierarchical management can be used also for the selection of the videos. When one scene of the highest order gathering all the scenes of one video is made to correspond to each video, it becomes possible to select a desired video among the videos registered from the window within the category of the framework described above and to display the list of the scenes of lower orders.

Reference numeral 1112 denotes an index which comprises icons 1114 and a time axis display portion 1116. It gathers several matters classified in accordance with the standard representing that although a given subject appears in different scenes, it is actually the same, and displays one representative icon 1114. The index displays the period in which these matters appear among the entire video by a line graph having the abscissa thereof extending on the time axis. The matters belonging to the same classification are managed by each object structure 500, and a pointer to a common object structure is provided to the high order object 516. On the other hand, the high order object has a pointer to the object structure for each matter in the low order object 518 in the form of the connection list. The index management portion 108 stores and manages the high order objects. It is a reduced image of the representative frame stored by the structure of the high order object that is displayed as the icon. The line graph examines each of the low order objects, calculates the period occupying the video as a whole from the start and end point frame numbers and illustrates the period. When pointing of the portion corresponding to the appearing period of the matter in this line graph is detected, the index management portion 108 lets the monitor window 1100 display the video of that portion. When the object is selected by pointing the icon and the associated information is given or changed, it is registered as the associated information of the high order object, that is, as the information common to all the matters of the same classification.

On the other hand, when pointing of the monitor window 1100 is detected, the point matter discrimination portion 102 detects which matter in the video is pointed to, from the information of the point position. This processing receives the playback position information 314 representing which of the scenes is under playback at present, from the logical video call portion 300, examines the start and end points for each of the objects stored in the object 1010 corresponding to the scene structure corresponding to the scene, compares them with the playback position information 316 representing the frame number which is now under playback, and judges whether or not the matter expressed by the object now appears on the screen. If it is judged as appearing, the present existing region of the matter is determined for each of the matters which are judged as appearing, from the positions of the matters, that is, from the position 514 of the object and from the playback position information 316, and judges whether or not the pointed position is contained in the existing region. When a plurality of coincidences are found, only one having high priority is selected. Priority can be expressed by the registration sequence of the connection list, for example. According to this method, it is not necessary to prepare a specific data region for priority. When the matter judged as being pointed exists, the object attribute information 520 in the object structure of that matter is examined, and a dictionary structure 800 having a key meaning the "jump destination of associated retrieval" is searched, and the scene jumps to the frame by reading the start frame number of the object registered to the link 810. When the key corresponding to the object attribute information 520 does not exist, the scene jumps to the scene in which another matter having the common high order object appears. In other words, the connection list of the low order objects registered to the object of the order ranked to the immediately higher order of the pointed matter is looked up, the start frame number of the next object connecting to this matter is read out, and the scene jumps to this frame.

As described above, it becomes possible to first hierarchically sound out and search the scenes, then to confirm the video on the monitor window, to make associated video retrieval and to again confirm it on the index window. This can be accomplished by introducing video management means by the logical videos constituted by the scenes.

Figure 15:
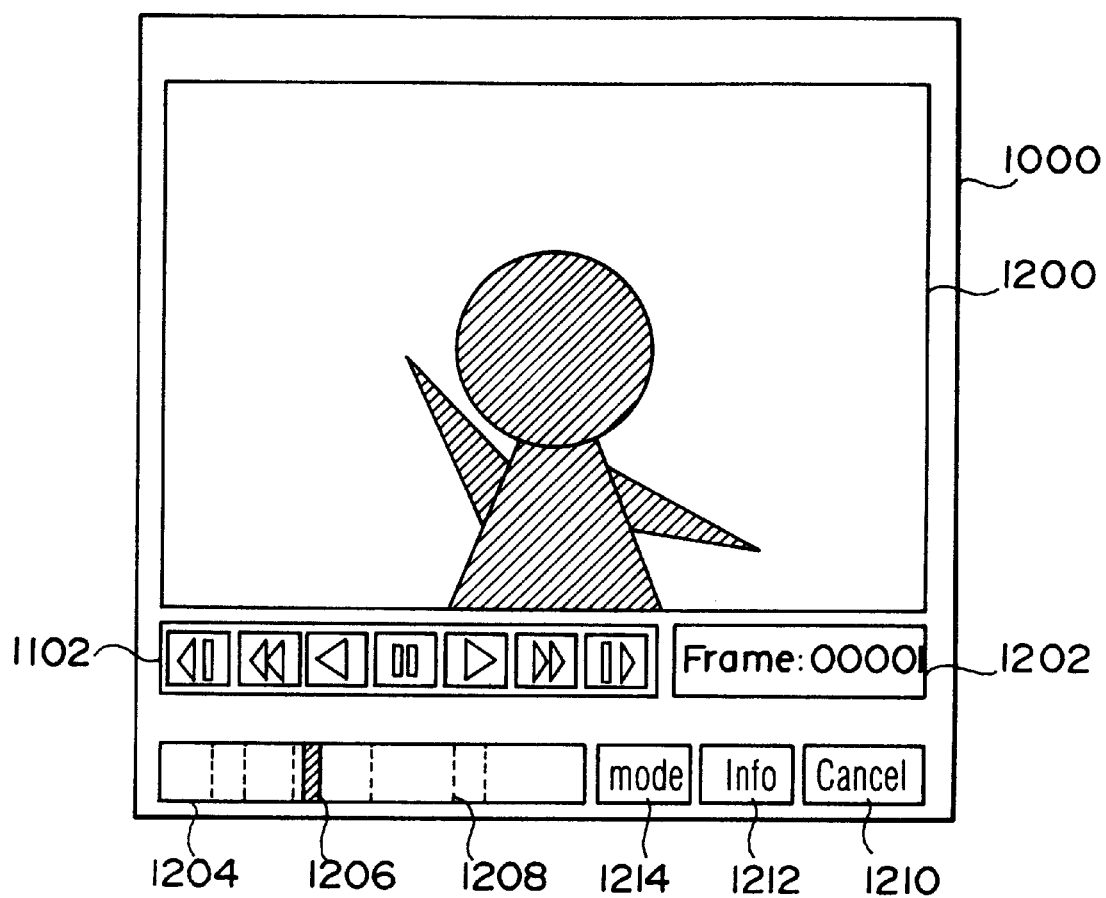
FIG. 15 shows a screen example showing a monitor window.

FIG. 15 shows an example of the detailed screen of the monitor window 1100. Reference numeral 1200 denotes a region in which the video is actually displayed, and reference numeral 1202 displays the frame number sent from the video playback portion 200 during playback. The portion which displays the frame number serves also the numerical value input portion, and when the numeral is corrected by the keyboard, etc, the video can be played back from the scene corresponding to the frame number by regarding the corrected numeral as the new frame number. Reference numeral 1204 denotes an indicator panel for displaying which portion of the entire video is now being played back. The playback position is indicated depending on at which position on this panel the indication rod 1206 exists. The position of the indication rod is calculated from the frame number described above and the structure data of the logical video under playback. A longitudinal rod 1208 denotes a line representing the turning point of the scenes, and makes it possible to intuitively know which scene is played back. According to this panel, it is possible to know distinctively the jump in associated retrieval by the great movement of the indication rod 1206, and to eliminate confusion whether or not the scene merely changes naturally in the video. When the indication rod 1206 is pointed and is forcibly moved by the drag operation, the operation panel portion 110 calculates the scene and the frame number corresponding to the moving position by using the position information which is defined after movement and is obtained from the point position detection portion 104, and can transmit this information to the video control portion 106 so that playback can be made from the video portion corresponding to this position. Reference numeral 1210 denotes a button for closing this monitor window.

Figure 16:
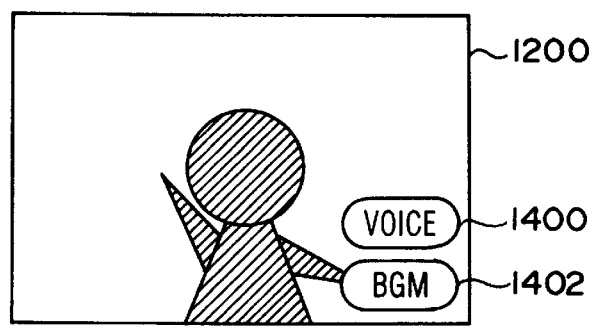
FIG. 16 shows a display screen example of the monitor window.

FIG. 16 shows an example of the video display screen when the object mapped to the sound exists. Since the sound is invisible information to eyes, it is visualized in the form of buttons 1400 and 1402. The sound is discriminated as the matter existence judgement portion 202 examines the object classification code 504. When checking which object appears by using the information on the scene under playback at present and on the frame, the matter existence judgement portion 202 displays the button when the classification code of the object which appears is that of the sound. The display position of the button is registered to the position 514 of the object. In this way, a jump to the scene associated with the sound can be made by pointing this button without changing the processing of the point matter discrimination portion. The button displays only the kind of the object mapped to the sound under playback at present, and can be identified by the title displayed on the button.

Figure 17:
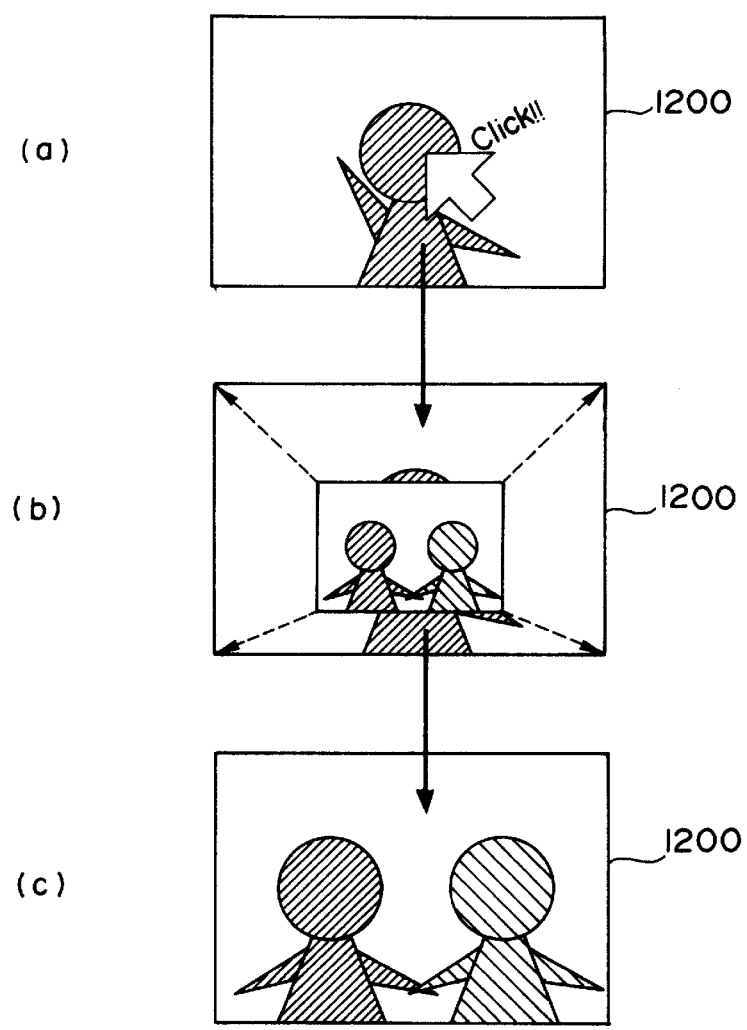
FIG. 17 shows a display screen example of the monitor window, respectively.

FIGS. 17(*a*) to 17(*c*) show an example of the display screen when jump is made to another scene in associated video retrieval. When the matter on the screen is pointed, the video playback/display portion 100 exhibits the change of a special effect so that this jump can be easily discriminated from the turning point of the ordinary scenes in the video. For example, this is effected in such a fashion that the reduced video display at the jump destination becomes greater and greater in an instant from the centroid of the region of the pointed matter. In this way, which matter is pointed can be easily learned.

Figure 18:
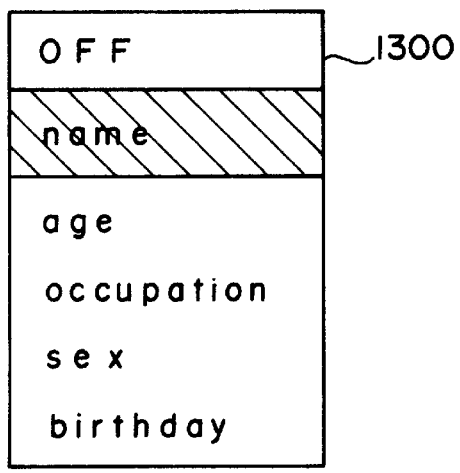
FIG. 18 shows an example of menu display.

Incidentally, reference numeral 1212 in FIG. 15 denotes a button for deciding whether or not the associated information of the matter should be displayed. When this button is pointed, a menu 1300 shown in FIG. 18, for example, appears. Besides OFF for extinguishing the display of the associated information, kind of the associated information which can be displayed at present is displayed on this menu. The user can select the desired associated information from this menu. This information is transmitted as the control signal 210 to the associated information display portion 204 of the video playback/display portion 100 through the video control portion 106, and decides whether or not the associated information should be displayed and which information corresponding to which key should be displayed when display is made. This menu is prepared for each video, and all the keys of the dictionary of the object attribute information 520 in all the object structures 500 registered for that video are examined and all of the kinds are listed on the menu. Reference numeral 1214 denotes a button for changing the operation mode, which makes it possible to switch the mode of associated video retrieval, the mode for changing the associated information, and so forth. The internal condition of the point matter discrimination portion 102 can be changed by this button and corresponding processing can be made to correspond to each internal condition when the point position detection portion transmits the point.

Figure 19:
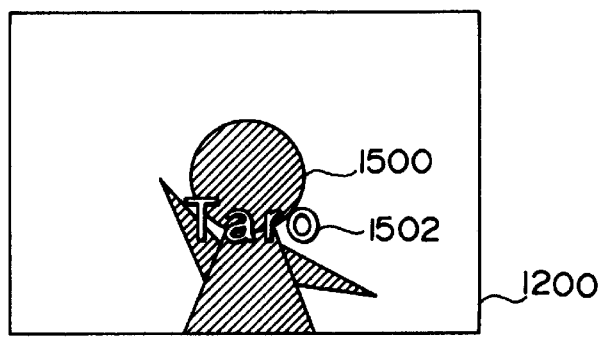
FIG. 19 shows a display screen example of the monitor window.
Figure 20:
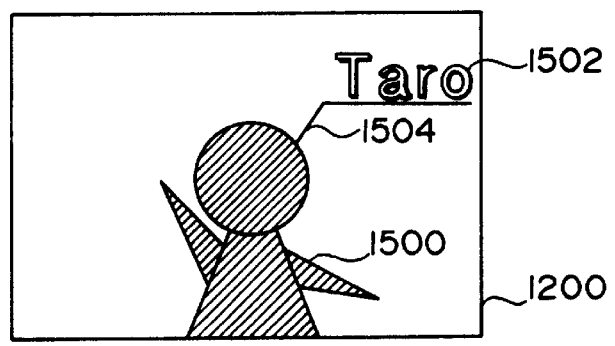
FIG. 20 shows a display screen example of the monitor window.

FIG. 19 shows an example of the screen for displaying the associated information. The associated information is displayed in superposition with the matter so that the relation between the matter 1500 in the video and its associated information 1502 can be known at a glance. When the matter existence judgement portion 202 defines the matter appearing at present by the procedure described above, the position 514 of the object is read out for such a matter, the centroid is determined from this position information, the centroid of the region which becomes necessary for displaying the associated information is determined, too, and the display position of the associated information is determined so that these centroids coincide with each other. However, when a plurality of matters are in close contact with one another, offset is applied to them lest the display of 1502 overlaps. The associated information 1502 is not limited to the text shown in the drawing but may be the image such as icon. That the corresponding matter is pointed can be discriminated when the point matter discrimination portion 102 points the display region of the associated information at the time of associated video retrieval so that jump can be made to another scene. This can be accomplished by providing two position information to one matter, and judging OR. As shown in FIG. 20, comprehensible display of the corresponding relation can be made by connecting the associated information 1502 to the matter 1500 by a connection line 1504. Particularly when the display position of the associated information 1502 is kept fixed and only the connection line is changed in accordance with the movement of the matter, associated video retrieval can be easily made by pointing the fixed associated information 1502.

Figure 21:
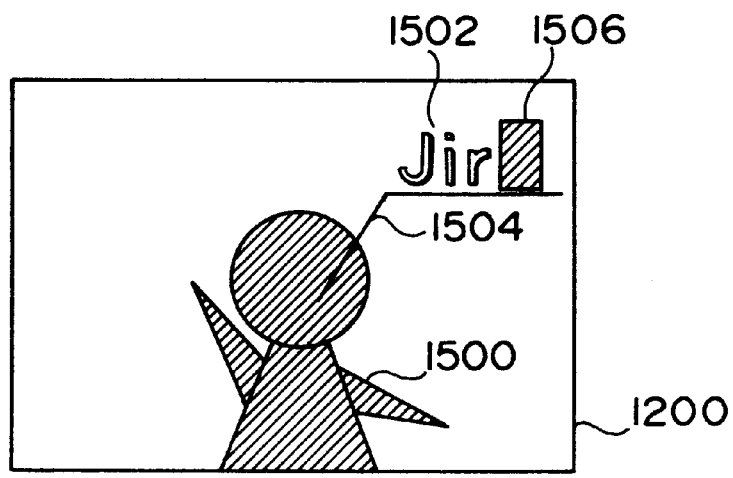
FIG. 21 shows a display screen example of the monitor window.
Figure 22:
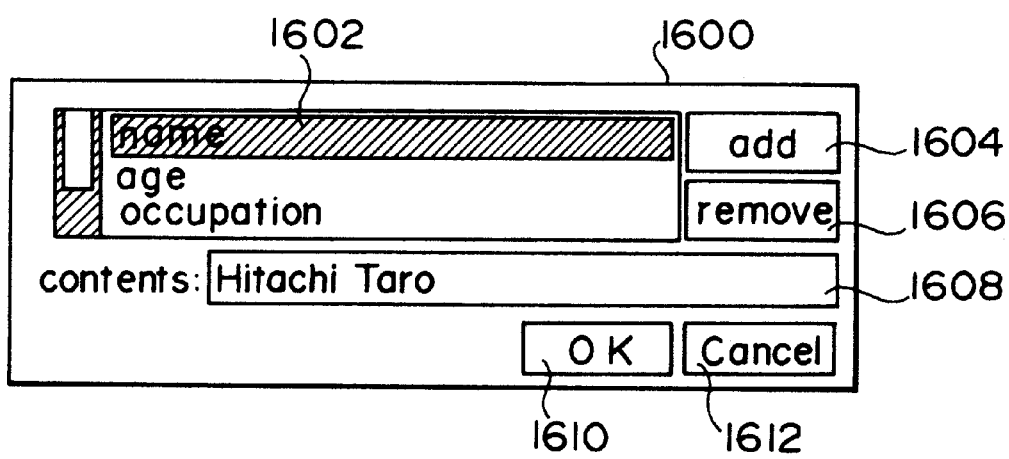
FIG. 22 shows a window for changing associated information.

When the internal condition of the system is in the associated information change mode, a character correction cursor 1506 appears when the text 1502 of the associated information displayed is pointed as shown in FIG. 21, and the change can be immediately made on the site by using the keyboard, etc. If the displayed information is the associated information stored in the object of a high order, the associated information for all the matters sharing in common the same high order objects are altogether updated. To change the associated information other than the displayed information, an associated information change window 1600 appears as shown in FIG. 22. Reference numeral 1602 denotes a list of a key of the associated information. Besides the associated information of the matters, the associated information of the high order objects also exist in this list. When a button 1604 is pointed, a character input window appears, and when a new key is input to this window, it is registered to the list 1602. The key displayed in the list 1602 can be selected by pointing, and when it is selected, it is highlighted. When any input is applied under this state to the character input region 1608, this input is registered as the associated information corresponding to the selected key. Reference numeral 1606 denotes a button for deleting the key. When the button 1606 is pointed under the state where the key is selected, registration of the associated information corresponding to the key and the key itself are deleted. Reference numeral 1610 denotes a button for pointing when such a change is accepted and the procedure is completed, and reference numeral 1612 denotes a button for cancelling all of the changes.

When the internal condition of the system is in a matter copy mode, it is possible to copy the matter appearing in the video during playback and to paste it to other videos between the motion pictures and between the sounds. This copying operation is effected by fully copying the structure of the object of the pointed matter. The object so copied shares the high order objects and is added as the lower order object of such high order objects. Pasting can be made by replacing the partial space of the video information of the pasted video having the same shape because the matter in the video is allowed to correspond to the partial space of the video information. Because copying/pasting can be made for the associated information, too, the quantity of the work relating to the associated information hardly exists.

The foregoing embodiment deals with the example where retrieval is carried out by using a computer of a work station level, but it can be also accomplished as a function of a VCR, a TV, and so forth.

According to the present invention, even when a desired scene cannot be specified from the index information when it is searched, the desired scene can be finally obtained by associatively retrieving the scenes in which any hints appear, provided that the scenes in which such hints associated with the desired scene can be found out. In this way, versatile video retrieval can be made by unitedly using the respective displays. The information relating to the matter in the video during playback can be known promptly and accurately without any confusion with other information. A part of or the entire information of the associated information of the matter appearing in the video during playback can be immediately changed on the instant that the matter appears. According to the monitor window of the present invention, the position of the scene during playback in the entire video can be always monitored, and even when the scene jumps in associated video retrieval, this jump can be clearly known due also to the special effect such as wipe, and the scene is not mixed with the ordinary switch of the scenes. The same effect as the effect of pointing the matter can be obtained when the display region of the associated information, which is displayed in superposition, is pointed. Accordingly, the operation factor can be improved by selecting a convenient method for each scene. Since the associated information to be displayed is prepared as a list, the trouble of directly inputting the key can be eliminated, and even when the operator forgets the keys, he can recall them by watching the menu. As described above, the present invention can accomplish associated video retrieval which is easy to operate. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A video retrieving apparatus, comprising:

video display means for displaying a video having a plurality of shots, each shot having frames continuing sequentially, in which one or more object pictures are shown;

a memory for storing object information which includes characterizing information describing characterizing features of respective object pictures contained in said frames of each shot and link information describing a position of a next shot in which a same object picture appears;

pointing means for pointing to an object picture within a frame of a video displayed on said video display means;

point detection means for detecting which object picture on the video displayed on said video display means is pointed to by a user using said pointing means; and object control means for determining at least one frame of a next shot including said object picture pointed to by said pointing means by using said characterizing information and said link information and playing said at least one frame included in said next shot on said video display means.

2. An associated video retrieving apparatus according to claim 1, further comprising attribute information superposition means, and wherein at least a part of information selected from attribute information of an object appearing in the next shot is displayed in superposition at the position of said object picture in the next shot being shown or is displayed in a form such that a correspondence relationship between said object picture and said attribute information thereof is clearly represented.

3. An associated video retrieving apparatus according to claim 1, further comprising attribute information changing means, and wherein at least a part of information of attribute information of an object picture appearing in the next shot being shown is immediately changed the instant that said object picture appears.

4. An associated video retrieving apparatus according to claim 1, further comprising an operation window having a region for displaying a video, a region for displaying a playback position of the video, a region for displaying buttons for controlling a display state of the video and a region for displaying buttons for representing the existence/absence of attribute information and for determining the kind of display information, as a partial region of a display screen in said video display means.

5. An associated video retrieving apparatus according to claim 1, wherein, when a shot changes as an object picture is pointed to, the shot change is effected by adding a specific video effect so that the shot change can be distinguished from a change of ordinary shots.

6. An associated video retrieving apparatus according to claim 1, wherein, when attribute information of an object picture is displayed, an object picture is determined as being pointed to when a display region of the attribute information of said object picture is pointed to, also.

7. An associated video retrieving apparatus according to claim 6, wherein which kind of attribute information should be displayed is designated by collectively displaying the kind of attribute information in a video as the object picture of associated video retrieval.

8. An associated video retrieving apparatus according to claim 6, wherein a display position of attribute information of an object picture is fixed, and correspondence with a matter is clearly represented by display of a line segment constantly changing so as to connect the position of said matter to the display position of said attribute information.

9. A video retrieving apparatus, comprising:

video display means having a video display region for displaying a video having a plurality of frames;

a memory for storing space information concerning space in each of said frames including at least one of a plurality of video objects, and link information which links said video objects to each other based on a logical structure;

point detection means for detecting which of said video objects within a displayed frame of said video is pointed to in accordance with pointing to said video display region by a user; and object control means for determining a frame having another video object linked to a video object being pointed to by said user according to said point detection means by using said space information and said link information, and playing a video having frames succeeding said frame which includes said another video object said video display region.

10. A video retrieving apparatus according to claim 9, wherein said memory stores information concerning time in which each of said video objects exists in said plurality of frames.

11. A video retrieving apparatus, comprising:

video display means having a video display region for displaying a video having a plurality of frames;

object searching means for searching for a space on each of said frames to locate a frame having a visual feature common with a video object being searched;

a memory for storing space information concerning space in each of said frames which includes at least one of a plurality of video objects, and said link information which links video objects to each other based on common visual features;

point detection means for detecting which of said video objects within a displayed frame of said video is pointed to in accordance with pointing to said video display region by a user; and object control means for determining a frame having another video object linked to a video object being pointed to according to said point detection means by using space information and said link information, and playing a video having frames succeeding said frame having said another video object on said video display region.

12. A video retrieving apparatus according to claim 11, wherein said memory stores information concerning time in which each of said video objects exists in said plurality of frames.

* * * * *